G. GOEWEY.
Churn.
No. 33,973.
Patented Dec. 17, 1861.
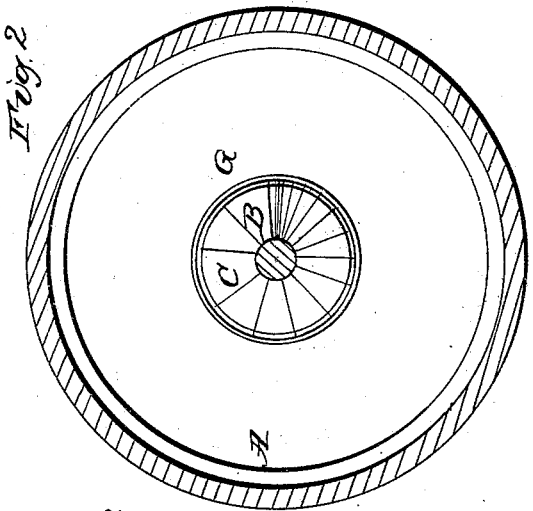
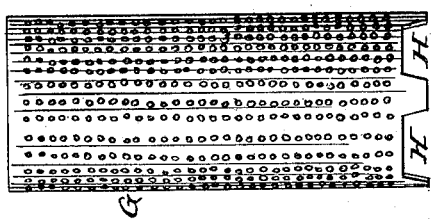
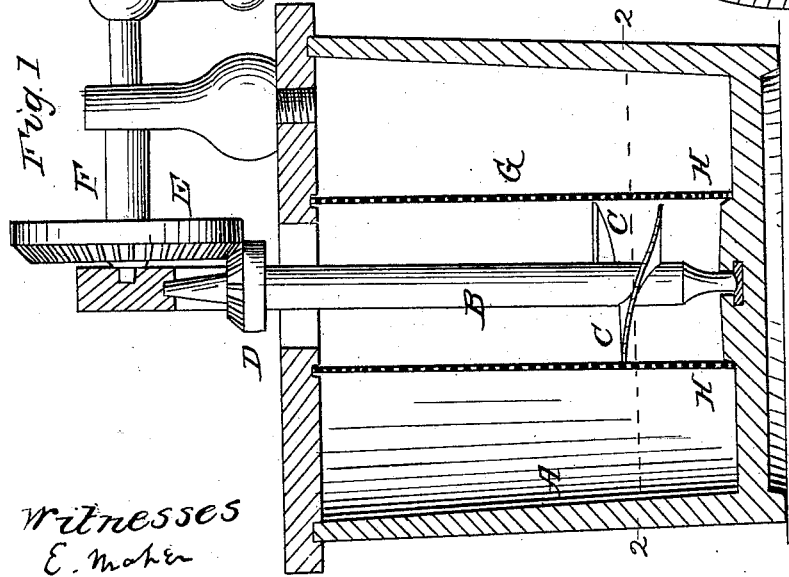
Witnesses
E. Moher
John P. Gray
Inventor
George Goewey

UNITED STATES PATENT OFFICE.

GEORGE GOEWEY, OF NEW YORK, ASSIGNOR TO HIMSELF AND E. S. MARSH, OF MORRISANIA, NEW YORK.

IMPROVEMENT IN CHURNS.

Specification forming part of Letters Patent No. 33,973, dated December 17, 1861.

*To all whom it may concern:*

Be it known that I, GEORGE GOEWEY, of the city, county, and State of New York, have invented a new and useful Improvement in Churns; and I do hereby declare that the following is a full, clear, and exact description of the same, reference being had to the accompanying drawings, making part of this specification.

Figure 1 is a vertical section of the improved churn. Fig. 2 is a horizontal section of the same at the line 1 2 of Fig. 1. Fig. 3 is a side elevation of the perforated cylinder in which the screw-shaft revolves.

Similar letters in the figures refer to corresponding parts.

The nature of this invention consists in placing within a suitable tub or vessel A a vertical stationary perforated cylinder inclosing an upright shaft having a "screw-propeller" near its lower end, to which is given a rapidly-revolving motion in such a manner as to cause the milk within the cylinder, together with air from above, to be driven through spaces at the lower end of the cylinder into the outer tub or vessel, and by the thorough agitation and commingling of the two to speedily produce butter of a superior quality.

To enable others skilled in the art to make and use my invention, I will proceed to describe its construction and operation.

The tub or vessel A may be made in the form represented or other suitable shape, and in its center is stepped a vertical shaft B, having an Archimedean screw blade or propeller C near its lower end extending up through an opening in the cover, which is fitted to the edge of the top of the tub or vessel A by a corresponding circular groove. This shaft is supported in its vertical position by its upper end entering an opening in a support secured on top of the cover, and is provided with a bevel pinion-wheel D between its upper end and the cover, which bevel-pinion meshes in gear with the corresponding cogs of a vertical bevel cog-wheel E, secured on a horizontal shaft F, having a crank at one end for giving it motion.

Immediately surrounding the screw blade or propeller C, with its edges almost touching the same, is arranged a vertical cylinder G, having spaces H formed in its lower end, which rests on the bottom of the tub or vessel A. This cylinder G is held in place at its lower end by a slight circular raising on the bottom of the tub or vessel A and at its upper end by its edge entering a corresponding circular groove in the lower surface of the cover, and is perforated from end to end with a multiplicity of small openings for readmitting the milk to the cylinder G after being driven through the larger openings or spaces H below, as will be hereinafter described. The milk to be churned being poured into the cylinder G and tub or vessel A and a rapid motion given the screw-shaft B, it is obvious that the screw blade or propeller C will force the milk within the cylinder G through the spaces or openings H below and into the outer space between the cylinder and sides of the tub or vessel A, and by depleting the quantity of milk within the cylinder will produce a partial vacuum above the screw-blade C, which will be supplied in part by exterior air through the opening in the cover and in part by the return of the milk through the small apertures in the cylinder from the tub or vessel A, and by the "splashing" or agitation of the milk the air and milk will commingle, and the two in this state will be forced through the spaces H, causing the oxygen of the air to be brought in contact with the fatty substances of the milk in so thorough a manner as to speedily convert the latter into butter. In the accomplishment of this object a peculiar spirally-revolving motion will be given the milk outside the cylinder G, which will cause the butter as it forms to "build" itself, as it were, around the sides of the tub or vessel A, gradually approaching the sides of the cylinder as it is formed until the whole mass of milk is converted into butter, thus leaving a space between the butter and cylinder and leaving the latter entirely clear of contact with the former, and therefore easily to be removed with the cover, screw-shaft, and other attachments from the tub or vessel A containing the butter.

From the foregoing it will be observed that as fast as the butter is formed it is deposited in a solid state around the sides of the tub or vessel A and is not beat or in the least agitated by the milk or by beaters, as in ordinary churns, and on this account it will be superior to that churned in the usual way.

The cylinder G may be made of perforated tin, as represented, wire-gauze, galvanized, or other suitable material; but tin is believed to be the best material with which to construct it.

What I claim as new, and desire to secure by Letters Patent, is—

The use or employment of the perforated cylinder G, in combination with the screw blade or propeller C, for the purpose of speedily producing butter and preventing it as formed being operated upon or agitated by the movement of the yet unconverted milk, substantially as described.

GEORGE GOEWEY.

Witnesses:
E. MAHER,
JOHN F. GRAY.